April 25, 1950 R. F. SPURCK 2,505,691
FRACTIONAL HORSEPOWER MOTOR AND COMPONENTS THEREOF
Filed April 7, 1948 2 Sheets-Sheet 1
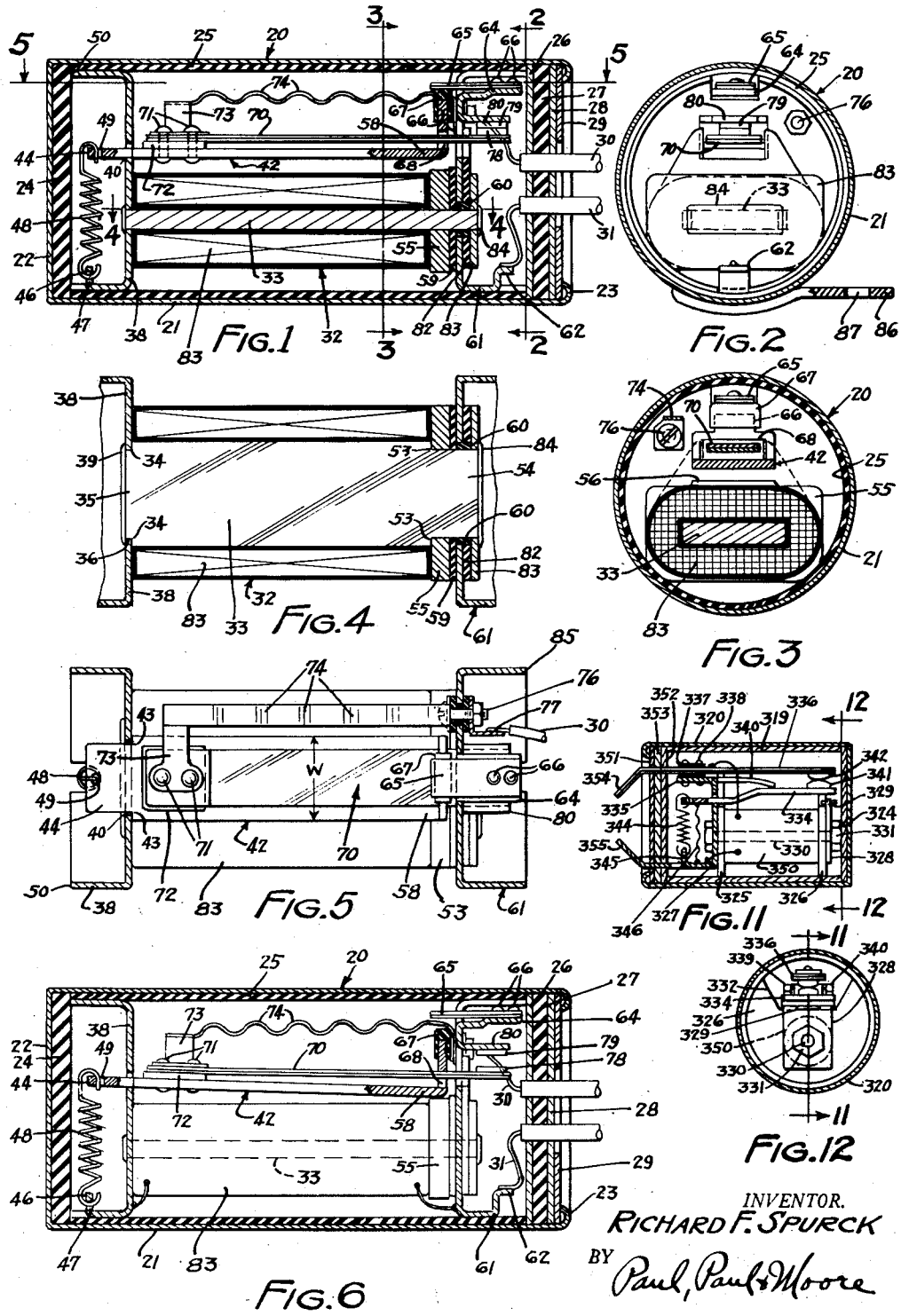
INVENTOR.
RICHARD F. SPURCK
BY Paul, Paul & Moore
ATTORNEYS

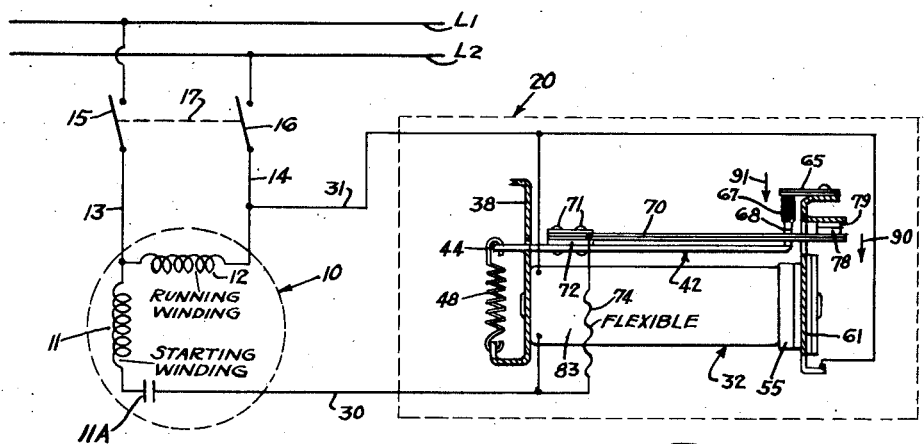

Patented Apr. 25, 1950

2,505,691

UNITED STATES PATENT OFFICE 2,505,691

FRACTIONAL HORSEPOWER MOTOR AND COMPONENTS THEREOF

Richard F. Spurck, Bloomington, Minn.

Application April 7, 1948, Serial No. 19,493

14 Claims. (Cl. 318—221)

This invention relates to improvements in motor circuits and the elements thereof and particularly to improvements in fractional horsepower motors of the single phase induction motor or split phase type. Such motors have what is ordinarily called running and starting windings of different impedances and arranged in the stator so as to produce a revolving field when both are energized in parallel during starting. The starting winding is energized for only a few seconds during the normal start and is then open-circuited or "cut-out" as its the more common term.

The open-circuiting operation is usually carried out by using a mechanical switch of the centrifugal type. Centrifugal switches vary widely in different motors and the servicing of such motors requires a large stock of centrifugal switches in order to fulfill the needs of various sizes of motors made by the same or different manufacturers. Small motor repair shops, therefore, find it necessary to stock a large and increasing variety of such "starting switches," and this adds greatly to the cost of service or conversely decreases the speed and availability of service.

It is an object of the present invention to provide improved motor circuits and component parts, and especially to provide an improved fractional horsepower split phase motor construction wherein the starting winding is controlled by a packaged unit relay switch which is connected in the circuit and controls the starting winding. It is also an object to provide an improved compact split phase motor starting system and switch which may be used in the motor repair trade to replace the conventional centrifugally operated switch.

It is a further object of the invention to provide an improved foolproof packaged motor starting switch of sealed non-adjustable type which is so housed as to be free from contamination due to dirt, oil and grease and of such size that it can be fitted with convenience into available space within or on the usual small split phase motor.

It is also an object to provide a small sealed capsule unit which may be used in the circuit with the running windings of motors to protect against over temperature of sustained or momentary overloads and one which is responsive to ambient temperature changes and heating due to loading.

The ordinary open centrifugal starting switch presents a distinct fire hazard in the operation of split phase motors, and this is especially true in capacitor type motors. It is an object of the invention to provide an improved motor wherein the starting switch is completely sealed and hence does not present a fire hazard.

In capacitor type motors arcing at the contacts occurs not only during the start but also during the stop for when the motor leads are disconnected with the motor still running the capacitor may stand fully charged, and it is discharged through the starting winding when the starting switch recloses as the motor stops. This produces bad arcing at the contacts and in addition the capacitor discharges through the starting winding causing a reverse torque and a forced stop which is a distinct disadvantage where the motor is connected to a load of high inertia.

It is a further object of the invention to provide an improved motor circuit and system wherein the starting capacitor is quietly discharged in addition to reducing the fire hazard.

Other and further objects of the invention are those inherent in the apparatus herein illustrated, described and claimed.

The invention is illustrated in the drawings in which

Figure 1 is a longitudinal sectional view through an illustrative embodiment of the motor control element of the present invention;

Figures 2 and 3 are transverse sectional views taken along the lines and in the direction of arrows 2—2 and 3—3, respectively, of Figure 1;

Figure 4 is a longitudinal fragmentary sectional view taken along the line and in the direction of arrows 4—4 of Figure 1;

Figure 5 is a longitudinal sectional view along the line and in the direction of arrows 5—5 of Figure 1, the housing being removed in this view;

Figure 6 is a longitudinal sectional view corresponding to Figure 1, except that the device is energized and actuated;

Figure 7 is a side elevational view of a motor, partly broken away and, and showing the controls nested within the usual motor end-bell of the housing;

Figure 8 is a schematic circuit diagram of a motor wired and controlled according to the present invention;

Figure 9 is another schematic wiring diagram corresponding to Figure 8, except that over-temperature control for the running winding is also included;

Figure 10 is a slightly modified form of controller;

Figures 11 and 12 are details of a slightly modified form of the invention, Figure 11 being a side elevational view, partly in section and taken in the direction of arrows and along line 11—11 of Figure 12, and Figure 12 being a transverse sectional view taken along the line and in the direction of arrows 12—12 of Figure 11.

Throughout the drawings corresponding numerals refer to the same parts.

Referring to the drawings, particularly Figure 8, there is illustrated a motor 10 having a starting winding 11, a starting capacitor 11A, where a capacitor is used, and a running winding 12 which are supplied through lines 13 and 14 and double pole switch 15—16 from alternating current feeders L₁ and L₂. The double pole switch 15—16 is operated by a single manual control 17 and when the switch is closed, energy is supplied to lines 13 and 14 and the running winding 12 is hence directly connected across the feeders L₁ and L₂. In the diagrammatic illustration of motor 10 there has been omitted the mechanical construction features, such as the construction of the stator, the rotor, bearings, etc. It will be understood that these are of conventional construction and that the rotor is of the usual squirrel-cage type. Likewise, the windings 11 and 12 are understood to be distributed around the stator in accordance with usual practice. Not all split phase motors use a capacitor 11A for starting. The present invention is applicable to both types. Where no capacitor 11A is used, lead 30 connects directly to winding 11. In place of the usual centrifugal switch there is provided a switching arrangement in a sealed unit, the enclosure or sealed housing of the unit being illustrated in Figure 8 by the dotted line 20. The unit 20 may be mounted within the motor housing or entirely externally and, if desired, remotely from the motor.

Referring particularly to Figures 1–6, there is illustrated one embodiment of the sealed unit relay switch 20 which is shown diagrammatically in Figure 8. The switch 20 includes an outer container 21, preferably of a deep drawn container having an integral bottom 22. When initially prepared the container is open at 23 and the edge of the casing at the open end is beaded down so as to seal in the working parts of the switch as hereinafter described. Within the container there is a bottom insulation plate 24 and an insulating liner 25, as well as a top insulating plate 26, a comparatively soft insulating washer 27, another insulating plate 28 and a centrally apertured metal pressure plate 29. The insulating plates 26, 27, 28 and the centrally apertured metal washer 29 form an end closure which rests upon the edge of the insulating liner 25 and hence when the side wall of the metal container 21 is beaded over at 23, pressure is placed upon the plate 29 and this is exerted through 28, 27, 26 and endwise through the tubular insulating liner 25 against the bottom insulating washer 24, thus forming a complete motor oil, grease and dirt-proof container.

Through the insulating closure assembly 26—29 there extend two connection wires 30 and 31 which are shown in Figure 8, these being the only external connections of the switch unit. The wires 30 and 31 are the starting switch connections for the running winding 11, Figure 8, and replace the connections to the ordinary centrifugal switch that is normally used for split phase induction motor starting.

The internal construction of the starting switch is as follows: There is provided a relay generally designated 32 having a central magnetic core 33 which has the thickness shown in cross section in Figure 1 and a width shown in the cross section in Figure 4. The core member 33 is notched at 34 so as to provide a tongue 35 which extends through an aperture 36 in the end stamping 38. The extending portion of the tongue 35 is riveted over at 39 and hence the end stamping 38 is firmly attached to the core member 33.

The stamping 38 is provided with a second aperture 40, Figures 1 and 4, through which the end of the armature generally designated 42 extends. The armature has the width W, shown in Figure 5, and is notched at 43 so as to provide an extending tongue 44 which reaches into the space formed by the end stamping. The end stamping is provided with an inturned tongue 46 which is apertured at 47 so as to provide an attachment for the lower end of the spring 48, the upper end of the spring being attached through a hole 49 in the end 44 of the armature. The spring 48 is in tension and tends to pull the end 44 of the armature toward the attachment 46 but the movement of the armature is limited as hereinafter described. Pivoting of the armature is about the edge of the aperture 48 in the end stamping. The aperture may be provided with a narrowed edge so as to minimize friction, if desired, although this is not necessary for satisfactory performance of the device. The edge 50 of the stamping 38 rests against the insulating washer 24 of the container and is firmly held therein when the container is crimped as hereinafter described.

At the opposite end the magnetic core 33 is likewise notched at 53 so as to provide an extending tongue 54 of somewhat greater length than the tongue 35. Upon the extending tongue 54 there are placed first a washer 55 of magnetically permeable material which is shaped so as to have an upwardly extending armature contacting surface 56 as shown in Figure 3. The washer 55 cooperates with the core 33 so as to complete the magnetic circuit to the front end 58 of the armature 42. Lying against the pole face washer 55 there is an insulating washer 59 and then there is placed an insulating sleeve 60 which serves to center the front end stamping generally designated 61.

Stamping 61 is generally cup-shaped but is provided with an inturned tip 62 to which the conductor in the wire 31 is attached by soldering or crimping. The stamping 61 thus forms one conductor in the relay and is insulated by washers 59, 82 and sleeve 60.

As shown in the upper part of Figure 1 the stamping 61 is provided with an inturned portion 64 to which, if desired, a short bimetallic strip 65 is riveted at 66. This strip 65, where used, operates to compensate for ambient temperature changes. The free end of the bimetallic strip 65 forms a stop for the armature 42 which has an upturned tip 66, the latter being provided with an insulating cap 67 of rubber, fiber or plastic which rests against the free end of the bimetallic strip 65 when the relay is de-energized. Flexure of the strip 65 due to ambient temperature changes thus varies the de-energized position of armature 42. It is also to be noted that factory adjustment can be made by bending portion 64 of the end stamping 61 so as to vary the setting of the strip 65 at any temperature. This provides a range of adjustment for the instrument during manufacture.

It may be pointed out that in some instances it is desirable to eliminate the ambient temperature compensation strip 65 and replace it with a strip of ordinary brass or fiber or other non-magnetic material. Where fiber is used for strip 65 the insulating cap 67 may be eliminated as the fiber does the insulating. Where brass is used for strip 65, cap 67 is is used. With either brass or fiber for strip 65, the mounting permits factory adjustment of the datum position of armature 42 by bending mounting 64. When bimetal 65 is replaced by a strip of brass or fiber or the like, the unit tends to open more slowly during starts which are at low temperatures but this is not a disadvantage because the starting windings are cooler and can then carry starting current for a longer time than when the windings are initially at a higher ambient temperature. The greater length of starting winding energization when cold is an advantage in overcoming a slow start due to congealed grease in bearings, etc.

The upturned tip 66 of the armature is apertured at 68 and through the aperture there extends a long bimetallic strip 70 which is attached to the surface of the armature 42 by means of rivets 71, it being noted that the strip 70 is held in spaced relation to the armature by the spacer member 72. Electrical connection is made to the strip 70 by means of the flexible connector 73 which is held against the strip 70 by the rivets 71. The connector 73 extends sideways from the bimetallic strip 70, as shown in Figure 5, and thence extends forwardly in the unit through a series of waves 74 which lend flexibility to the strip, and is fastened to a connecting stud 76 which is insulated from the front stamping 61. The stud 76 also holds a terminal 77 to which the lead wire 30 is also attached.

It will be noted that the bimetallic strip 70 extends through the aperture 68 in the armature, the aperture being of sufficient size so that the strip is free to move a limited distance up and down in the aperture. The front end of the bimetallic strip 70 carries one of the contacts 78 of the device. The opposite contact 79 is carried on the strip 80 which is punched inwardly in the front end stamping 61.

The stamping 61 is held in place by the insulating washer 82 which is in turn held tightly by the metal washer 83 that is held by the riveted over end of tongue 54, as shown at 84. In the space between the rear stamping 38 and the front pole face washer 55 there is provided the relay winding 83. The size of the winding is such that it is held snugly when the assembly is riveted up as illustrated. The front edge 85 of the stamping 61 receives a slight thrust from the end closure insulating washer 26 when the closure is beaded in at 23, but the thrust is not sufficient to cause any deformation of the unit and disturb any adjustment previously made. It may be noted that the insulating washer 27 can be of comparatively soft material so as to provide a snug fit around the lead-in wires 30 and 31 when pressure is applied due to the beading in at 23. The device can be hermetically sealed by a protector dip coating, and the unit is thus completely protected from dust, dirt, grease, oil and moisture, and in addition the contacts being sealed, considerably reduce the fire hazard of the motor. As a fire risk the motor therefore becomes fully equivalent to a completely sealed motor.

The outer shell 20 is provided with a widely extending attachment ear 86 which is spot welded to the shell 22, the ear being apertured at 87 so that the device can be conveniently attached within the end bell 88 of the motor 10, as shown in Figure 7. The attachment may be made by a bolt or screw 89 and the unit can be placed wherever convenient since the lead wires 30 and 31 are of sufficient length to permit the unit to be wired into the starting winding circuit. If desired, the unit can be mounted externally on the motor frame or even remotely from the motor. When the unit is mounted in or on the motor casing or elsewhere, care is taken to position the casing 20 at least $\frac{1}{16}$ inch from any surrounding magnetically permeable members in order that sneak magnetic circuits shall not disturb the operation of the relay.

Referring again to Figure 1 the winding 83 is solidly connected to the lead wires 30 and 31 within the unit 20 and when the switch unit is connected, as illustrated in Figure 8, a circuit is constantly maintained from lead wire 13 through the starting winding 11, thence through starting condenser 11A (where used) and thence through wire 30, winding 83, lead wire 31 and to the feeder 14. The contacts 78 and 79 are connected in shunt to the winding 83. Thus, the circuit also extends from feeder 13 through the starting winding, thence through the feed wire 30 and the flexible strip 73 within the unit, directly to the bimetallic strip 70, thence through contacts 78 and 79 to the end stamping 61 which is connected directly to the connection wire 31 and thence to the feed wire 14. Hence, when the contacts 78 and 79 are closed, the winding 83 of the relay is short circuited and during starting current flows through the starting winding in an amount determined by the impedance of the starting winding circuit. It will be noted that this starting circuit includes the bimetallic strip 70 and hence the starting winding current flowing through the bimetallic strip 70 causes the strip to be slightly heated, and since the relay armature is at this time immovably held against strip 65, and the strip 70 is fastened at 71—71, as the strip 70 heats it flexes in the direction of arrow 90 and withdraws contact 78 from engagement with contact 79. The movement of the bimetallic strip 70 is not as abrupt and hence the slight opening of the contacts 78 and 79 thus initially makes only a slight break in the circuit, but this is enough to cause the current flowing in the circuit to be re-routed through the winding 83 of the relay which is accordingly energized. This causes the armature 42 to be snapped down against the pole piece 55. This energized position is shown in Figure 6. When this occurs the edge of the aperture 68 in the armature engages upon the upper face of the bimetallic strip 70 and draws the strip firmly away from the contact 79, thus insures wide opening of the contacts 78 and 79. Thus, while the breaking of the starting current through the starting winding 11 is initiated by the action of the bimetallic strip 70, the breaking of this current is made positive in that contacts 78 and 79 are widely opened by the action of the relay. The relay armature 42 remains operated all the while the motor 10 is energized and a slight current flows through the starting winding 11 and through the relay winding 83. This current is of negligible proportions so far as the starting winding is concerned because the impedance of the winding 83 is made large as compared with the impedance of the starting winding 11. However, this current through the starting winding 11 and through the relay winding 83 is of sufficient value to maintain the relay operated, and hence the armature 42 is held in the position shown in Figure 6 with the contact 78 separated from the contact 79. When the motor is stopped by opening switch 15—16 the armature 42 again resumes the position shown in Figures 1 and 8.

The bimetallic strip 65, when used, affords temperature compensation for variations in ambient temperature, and the mounting 64 also conveniently affords a means of factory adjustment of the unit prior to assembly, regardless of whether strip 64 is bimetal, brass, fiber or the like. As the main bimetal strip 70 is heated or cooled due to changes in ambient temperature (when the motor 10 is not running), there are slight variations in the flexure. Thus, as the strip cools greater contact pressure is exerted and the center portion of the strip 70 would tend to flex up were if not for the temperature compensation afforded by the short strip 65 which likewise moves in the direction of arrow 91 when the ambient temperature decreases. This tends to lower the strip 70 as a whole and removes the excess pressure. The length and the temperature coefficient of curvature of strip 65 may be selected so as to maintain any desired variation of contact pressure between contacts 78 and 79 as the temperature varies from a predetermined ambient temperature.

In Figure 9 the unit 20 and its function is identical with the unit 20 in Figure 8 and is connected to the motor 10 in precisely the same way as in Figure 8. The only difference in these figures is that the lead 14 has been opened and another unit 100 connected by means of connecting wires 101 and 102. The unit 100 is substantially identical with that described with reference to Figures 1 through 6 except with the following differences:

The bimetallic strip 170 is connected as in Figures 1–6 or through a flexible connector 173 so as to carry the total motor current, but it has a coefficient of resistance which is much lower than strip 70, so as to be heated to a much lesser degree by the total starting current which surges through the motor during the short starting period. However, the strip 170 is always in the motor circuit and is therefore steadily heated not only by the load current but is also subject to ambient temperature changes and to general heating of the motor, which factor can be accentuated by locating the unit 100 within the casing of the motor and in the path of the ventilating air of the motor, or otherwise in heat communication with the interior of the motor. The strip 170 then becomes responsive to load current and to temperature changes of the motor. Therefore, when the load current increases, the contacts 178 and 179 open and re-route the load current through the relay winding 183 which accordingly causes the armature 142 to be drawn downwardly and to open widely the contacts 178 and 179. The contacts do not re-close until the power supply is interrupted so as to allow armature 142 to move to its de-energized position and then only when strip 170 has cooled sufficiently to permit reclosure.

The unit 170 may, if desired, be slightly modified by making the connector 173 in the form of a resistance unit. Since the connector 173 is positioned inside the housing of the unit 100 in close proximity to strip 170, the load current flowing through the connector 173 can thus impose heat upon strip 170. Thus, if the unit 173 is made in the form of a resistance it produces a heating effect within the housing 100, in addition to that produced by strip 170 itself, and thus the temperature conditions to which the strip 170 is exposed is the resultant of ambient temperature and the heat input due to the load current flowing through the strip 173 and bimetal strip 170 in series.

In Figure 10 there is shown a slightly modified form of the invention in which the armature 242 does not carry the main bimetallic strip. The position of the armature is in this unit determined by an ambient temperature compensating strip 265 which has a lug 266 riveted to it at 267. The lug extends downwardly and forms a stop surface at 268 against which the armature 242 engages when the relay is de-energized. The lug 266 is apertured at 269 and through the aperture there protrudes the main bimetallic strip 270 which is attached to the rear metal stamping 238 but is insulated therefrom as indicated at 272. In this form of the invention the circuit is through lines 231 and thence directly through connection 232 to the bimetallic strip 270 and thence through the strip. Since strip 270 has resistance it is slightly heated by the currents flowing therethrough. The circuit then extends through the contact 279 which is mounted on the front end of the strip 270 and thence through the contact 278 which is attached to the armature 242, thence through an appropriate connection to lead wire 230. The winding 283 of the relay is connected directly across the lead wires 230 and 231. In this form as the strip 270 flexes due to the starting or load current flowing therethrough, it moves upwardly in the direction of arrow 290 and upon separating contact 279 and 278, the potential is applied across the winding 283, which being thereby energized draws the armature 242 downwardly and thus more widely separates the contact 278 from contact 279. It may be noted that the size of the aperture 269 in the lug 266 prevents the bimetallic strip 270 from being drawn downwardly by the actuation of the armature 242 in case there is any burning or sticking of the contacts which occasioned a partial opening of the circuit. Thus, when the armature 242 operates should the contacts 278 and 279 be hung together, the downward movement of the armature would continue until the strip 270 is drawn against the boundary of the aperture 269 in the lug and then the strip 270, being more firmly restrained, the contacts are drawn firmly apart.

In Figures 11 and 12 there is illustrated a small compact form of the invention similar to that shown in Figure 10 but with the ambient temperature compensation strip 265 removed and with added adjustment for the datum position of the armature. In the device shown in Figures 11 and 12 the case 320 is lined with an insulating end washer 324 and insulating cylindrical shield 319 which serves to position and centrally locate the two fiber or plastic washers 325 and 326. These washers are slipped onto a square or rectangular core bolt 330 and are held in place between the pole pieces 327 and 328, the latter being drawn down tight in assembled relation by the nut 331 on the end of bolt 330. Pole piece 328 is provided with a single-turn shading pole winding 329.

The fiber washers 325 and 326 are notched, as shown at 332 on washer 326 (Figure 12), so as to provide space for the armature 334 which is mounted through a cut-out in pole piece 327. The pole piece 327 has a trifurcated upper end, the middle furcation 335 being bent to the left (in Figure 11) so as to form a perch for the bimetallic strip 336 which is mounted in insulated relation thereon by insulation washers 337 and rivets 338. The side furcations 339 and 340 (Figure 12 especially) are bent to the right (in Figure 11) and slightly downwardly, and provide a bendable adjustment stop against which the relay armature 334 abuts. The pieces 339 and 340 can be bent slightly during manufacturing adjustment, so as to establish the point (and consequently the temperature) at which contacts 341 and 342, which are mounted upon armature 334 and bimetallic strip 336, respectively, close. Spring 344 is attached at its lower end to a turned up nib 345 in a lower outward projection of the pole piece 327 and is attached at its upper end to an aperture in that portion of armature 334 which protrudes through the slot in pole piece 327. A very flexible pig tail connection 346 is connected between the armature 334 and pole piece 327 so as to by-pass any current that might otherwise tend to flow through spring 344 and thus heat and ruin it. The coil 350 is connected to the bimetal strip 336 and to the pole piece 327 and is hence connected "across" the contacts 341 and 342 and is consequently energized when the contacts open. The bimetal strip and the tab 355 on pole piece 327 extend through slits in the fiber washers 351 and 352 and through a gum rubber washer 353 which is situated between the fiber closure washers. The gum rubber is compressed and expanded when the case is beaded closed and firmly seals the entire unit against moisture, dirt and entrance of air or gases. The unit being sealed is consequently proof against fire hazards and a motor controlled by it is explosion proof, even though the motor is otherwise ventilated. Circuit connections are made to the protruding inwardly bent tab 354 (of the bimetal strip) and to the tab 355 of the pole piece 327. Depending upon the resistance characteristics of the bimetal strip 336, the unit may be used for motor starting control, as at 20 in Figures 8 and 9, or for overload control as, for example, at 100 in Figure 9.

As many apparently widely different embodiments of this invention may be made without departing from the spirit and scope thereof, it is to be understood that I do not limit myself to the specific embodiments herein except as defined by the appended claims.

What I claim is:

1. In a single phase electric motor having a starting winding and a running winding, the improvement comprising a relay having a relay winding and an armature operated thereby, said relay winding being connectable in series with said starting winding to form a starting winding branch which as a whole is connected in parallel with the running winding of the motor, said relay winding having an impedance sufficiently high to limit current therethrough to a negligible minimum but sufficient to maintain said relay actuated when the motor is energized and running, a pair of normally closed starting contacts connected across said relay winding for effectively shunting said relay winding from series connection in the starting winding branch, thermally actuated means responsive to heat generated by starting current flowing through said contacts and starting winding for opening said contacts slightly, thereby to remove said shunt across the relay winding to permit said winding to be energized and operate the relay armature, and means actuated by the operation of the armature positively to move said contacts to widely opened condition when the relay winding is energized.

2. In a single phase electric motor having a running winding and a starting winding, the improvement comprising a unit motor starting relay having a winding and an armature actuated thereby, said relay winding being connectable in series with the starting winding of the motor to form a starting branch which as a whole is then connected in parallel with the running winding, said relay winding having a sufficiently high impedance such that during normal running of the motor it limits the current through the starting winding to a negligible amount as compared with the total operating current of the motor but still to an amount sufficient to maintain the relay armature operated, a pair of motor starting contacts mounted with reference to the armature of the relay so as to be closed when the relay winding is de-energized and positively opened when the relay is energized, said motor starting contacts being connected in shunt with the relay winding so as to carry the starting current through the contacts when they are closed, bimetallic thermal means responsive to the heat generated by the current flowing through said starting winding when the motor is energized with said contacts closed for initially slightly opening said contacts thereby to energize the relay winding and cause actuation of the armature thereof.

3. The improvements of claim 1 further characterized in that one of said contacts is mounted in fixed position and the other is carried by said thermal means which in turn forms a part of the relay armature and is mounted in such a position that when the relay is de-energized and no current is flowing through the starting winding the thermal means maintains the contacts closed.

4. The improvements of claim 1 further characterized in that one of said contacts is mounted on said relay armature and the other is carried by said thermal means in such a position that when the relay is de-energized and no current is flowing through the starting winding, the thermal means maintains the contacts closed, said thermal means being mounted so as to be movable with reference to the armature when the relay is de-energized and said thermal means is actuated, said armature being formed so as to move said contact carried thereby to open circuit position when the relay is energized upon initial opening of the contacts by said thermal means.

5. The apparatus of claim 1 further characterized in that said relay winding, relay armature, contacts and thermally actuated means are sealed in a small container having a mounting lug extending therefrom, said mounting lug being shaped so as to hold the small container in spaced relation to an adjacent surface when the lug is fastened to said surface.

6. In a single phase electric motor having a shell, rotor and starting and running windings, the improvement comprising a starting switch unit in a sealed container of small size and having a mounting bracket thereon for fastening the container within or on the motor shell but in spaced relation to magnetically permeable portions of the motor for controlling the starting winding of the motor, said container including a relay coil and an armature operated thereby, connection leads from the coil and through the container forming the sole electrical connection by which the coil may be connected to the starting winding of the motor, said relay including a pair of contacts within the container connected in shunt with the coil of the relay and across said connector leads and positioned so as to be closed when the relay coil is de-energized, thermal means within the sealed container responsive to the heat produced by starting current flowing through said contacts for initially slightly opening the contacts and means for positively and fully opening said contacts when the armature is actuated due to energization of the relay coil upon initial slight opening of the contacts, said armature being incapable of initiating the opening of said contacts, the impedance of the relay coil being sufficiently large to reduce the current through the relay coil and a starting winding connectable thereto to an unobjectionable minimum when the contacts are open, said minimum current being sufficient however to hold the relay armature operated.

7. The apparatus of claim 6 further characterized in that said thermal means is a bimetallic strip and carries one of the contacts, said armature carrying the other contact and having a datum position when de-energized, the contact actuated by said strip being initially opened from engagement with its cooperating armature carried contact when said strip is heated in response to starting current flowing through said contacts.

8. The apparatus of claim 6 further characterized in that said thermal means is a bimetallic strip mounted on the relay armature, said armature having a datum position when de-energized, and one contact is carried by and actuated by said strip so as to be initially opened from engagement with its cooperating contact when said strip is heated in response to starting current flowing through said strip and thence through said contacts and then widely opened by actuation of said armature.

9. An article of manufacture comprising a closed container of small size adapted to be fitted into a small space such as a space in the housing of a small single phase motor having starting and running windings, a starting switch mechanism for controlling the current through the starting winding of such motors fitted entirely within and sealed within said housing and constituting the entire motors starting switch mechanism, said mechanism within said container including a relay having a coil and an armature actuated when the coil is energized, a pair of circuit connections extending into said closed container but insulated therefrom and constituting motor starting switch connections, a pair of contacts within the container connected to the connections to close a circuit through said connections, said relay coil within the container being connected across said contacts, means entirely within said small container including a device responsive to the heat generated by starting winding current flowing through said contacts for initially slightly opening said contacts thereby to cause energization of the relay coil connected across said contacts, and means including said armature for moving said contacts to fully open condition when the armature moves in response to such energization of the relay coil.

10. The article of manufacture described in claim 9 further characterized in that the housing is a small cylindrical capsule and is fitted with a mounting bracket extending to at least one side of said capsule for holding the capsule in spaced relation to a surface to which the bracket is fastened.

11. The article of manufacture described in claim 9 further characterized in that said device responsive to heat is a bimetal strip, one of said contacts being mounted on the strip so that the starting winding current is carried therethrough and the strip accordingly heated.

12. The article of manufacture described in claim 11 further characterized in that the armature is provided with a stop which establishes a fixed position for the armature when the relay coil is de-energized, said contacts being then closed and thereafter opened when the bimetal strip flexes due to heating by current flowing therethrough.

13. The article of manufacture described in claim 12 further characterized in that the stop is controlled by a second bimetal strip responsive to ambient temperature so as to maintain reasonably constant, despite variations in ambient temperature, the amount of heating required to flex the first bimetal strip and thereby initially open the contacts.

14. As an article of manufacture a motor control switch comprising a small metal capsule closed at one end, an insulating closure for the other end, the metal capsule and closure being sealed so as to form a sealed container, a strip extending through the closure and forming a first connection terminal outside the closure and having a free end extending within the capsule, said free end within the capsule being of bimetal and movable as the strip is heated and cooled, a metal relay frame within the capsule and insulated from the capsule and bimetal strip, said frame having a tab extending through the closure and forming a second connection terminal outside the closure, a relay coil mounted within the capsule on the metal frame, an armature electrically connected to the relay frame and having a free end, said armature being mounted on said relay frame in a position generally parallel to the free end of the bimetal strip with the free ends of the armature and bimetal strip adjacent, means for biasing the armature towards said strip, a pair of contacts, one being mounted on the armature and the other on the bimetal strip in positions to engage each other when the free ends of the armature and strip move relatively towards each other, said bimetal strip when heated being movable away from the armature, the armature being movable away from the strip when the relay coil is energized and toward the strip when the coil is de-energized, a stop for determining the position of said armature with reference to the free end of the bimetal strip when the relay coil is de-energized, said relay coil having one terminal connected to the bimetal strip and the other connected to the relay frame.

RICHARD F. SPURCK.

REFERENCES CITED

The following references are of record in the file of this patent:

UNITED STATES PATENTS

| Number | Name | Date |
|---|---|---|
| 721,387 | Potter | Feb. 24, 1903 |
| 1,828,724 | Yost | Oct. 20, 1931 |
| 1,997,673 | Boothby | Apr. 16, 1935 |
| 2,029,267 | Leece et al. | Jan. 28, 1936 |
| 2,169,989 | Pearce | Aug. 15, 1939 |
| 2,279,214 | Veinott | Apr. 7, 1942 |
| 2,304,018 | Raney | Dec. 1, 1942 |
| 2,398,993 | Ayers | Apr. 23, 1946 |
| 2,436,633 | Curzon | Feb. 24, 1948 |
| 2,447,488 | Clark | Aug. 24, 1948 |

Certificate of Correction

Patent No. 2,505,691 April 25, 1950

RICHARD F. SPURCK

It is hereby certified that error appears in the printed specification of the above numbered patent requiring correction as follows:

Column 10, line 26, after the word "winding" insert *and said starting contacts*; and that the said Letters Patent should be read with this correction therein that the same may conform to the record of the case in the Patent Office.

Signed and sealed this 22nd day of August, A. D. 1950.

[SEAL]

THOMAS F. MURPHY,
*Assistant Commissioner of Patents.*